United States Patent
Chang

[19]

[11] Patent Number: 5,986,407
[45] Date of Patent: Nov. 16, 1999

[54] CONTROL APPARATUS FOR PERMITTING OPERATION OF AN AC-POWERED LAMP UNIT AS AN EMERGENCY LIGHTING DEVICE

[75] Inventor: Hsia-Chin Chang, Taipei Hsien, Taiwan

[73] Assignee: Tasua Electronics Co., Ltd., Taipei Hsien, Taiwan

[21] Appl. No.: 09/074,635

[22] Filed: May 7, 1998

[30] Foreign Application Priority Data

Apr. 1, 1998 [TW] Taiwan .................................. 87204874

[51] Int. Cl.$^6$ ...................................................... H05B 37/00
[52] U.S. Cl. ............................. 315/86; 315/171; 315/136; 315/DIG. 7
[58] Field of Search .............................. 315/86, 171, 129, 315/136, 200 R, DIG. 7; 307/64, 66, 153, 157

[56] References Cited

U.S. PATENT DOCUMENTS

| | | | |
|---|---|---|---|
| 3,599,070 | 8/1971 | Davis et al. ............................. | 320/163 |
| 3,684,891 | 8/1972 | Sieron ....................................... | 307/66 |
| 3,688,123 | 8/1972 | Walker ...................................... | 307/66 |
| 4,890,004 | 12/1989 | Beckerman ............................... | 307/66 |
| 5,015,919 | 5/1991 | Vila-Masot et al. ...................... | 315/86 |

*Primary Examiner*—Haissa Philogene
*Attorney, Agent, or Firm*—Christensen O'Connor Johnsonn Kindness PLLC

[57] ABSTRACT

A control apparatus for an ac-powered lamp unit includes a charging circuit for generating a constant current output from an ac power source, a storage battery charged by the constant current output and supplying a dc voltage output, a first high-voltage oscillator circuit for converting the dc voltage output of the storage battery into a first high-voltage oscillating signal, a second high-voltage oscillator circuit for generating a dc voltage signal from the ac power source and for converting the dc voltage signal into a second high-voltage oscillating signal, a switch circuit connected to the first and second high-voltage oscillator circuits, and a switch control circuit for controlling the switch circuit to provide the second high-voltage oscillating signal from the second high-voltage oscillator circuit to an ac-powered lamp unit when the ac power source is available, and to provide the first high-voltage oscillating signal from the first high-voltage oscillator circuit to the ac-powered lamp unit in case of a power outage.

8 Claims, 3 Drawing Sheets

CONTROL APPARATUS FOR PERMITTING OPERATION OF AN AC-POWERED LAMP UNIT AS AN EMERGENCY LIGHTING DEVICE

BACKGROUND OF THE INVENTION

1. Field of the Invention

The invention relates to a control apparatus for ac-powered lamp units, more particularly to a control apparatus that permits operation of an ac-powered lamp unit as an emergency lighting device.

2. Description of the Related Art

The conventional lighting arrangements found in corridors and stairways of buildings are designed to operate only when commercial ac power is available. Thus, emergency lighting devices must be installed to provide light in the event of a power outage. The conventional emergency lighting device generally includes at least one lamp unit and a storage battery. The lamp unit is disabled when commercial ac power is available. At the same time, the commercial ac power is converted into dc power for charging the storage battery. In the event of a power outage, the storage battery is connected automatically to the lamp unit, thereby enabling the latter to generate a light output.

Because power outages seldom occur nowadays, the conventional emergency lighting device functions primarily as a back-up lighting device. As such, the conventional emergency lighting device is not used efficiently, and operability of the conventional emergency lighting device cannot be detected unless periodic maintenance is performed. Moreover, because the conventional emergency lighting device is in a back-up state most of the time, unnecessary charging of the storage battery is performed for prolonged periods of time. The service life of the storage battery is adversely affected, thereby necessitating periodic inspection of the storage battery for replacement of the latter in the event of damage.

SUMMARY OF THE INVENTION

Therefore, the main object of the present invention is to provide a control apparatus that permits operation of an ac-powered lamp unit as an emergency lighting device, thereby obviating the need for a back-up emergency lighting device.

Another object of the present invention is to provide a control apparatus of the aforementioned type, wherein a storage battery is charged periodically after charging to full capacity, thereby prolonging the service life of the storage battery.

A further object of the present invention is to provide a control apparatus of the aforementioned type with a charging indicator circuit to indicate the status of the charging operation.

According to this invention, a control apparatus for an ac-powered lamp unit comprises:

a charging circuit adapted to generate a constant current output from an ac power source;

a storage battery connected to the constant current circuit so as to be charged by the constant current output, the storage battery supplying a dc voltage output;

a first high-voltage oscillator circuit connected to the storage battery for converting the dc voltage output of the storage battery into a first high-voltage oscillating signal;

a second high-voltage oscillator circuit adapted to generate a dc voltage signal from the ac power source, and to convert the dc voltage signal into a second high-voltage oscillating signal;

a switch circuit connected to the first and second high-voltage oscillator circuits and adapted to provide one of the first and second high-voltage oscillating signals from the first and second high-voltage oscillator circuits to the ac-powered lamp unit; and a switch control circuit connected to the charging circuit and the switch circuit, the switch control circuit controlling the switch circuit to provide the second high-voltage oscillating signal from the second high-voltage oscillator circuit to the ac-powered lamp unit when the ac power source is available, and to provide the first high-voltage oscillating signal from the first high-voltage oscillator circuit to the ac-powered lamp unit in case of a power outage.

Preferably, the charging circuit includes: a voltage regulating circuit adapted to generate a regulated dc voltage signal from the ac power source, the regulated dc voltage signal being provided to the switch control circuit; a constant current circuit connected to the voltage regulating circuit for generating the constant current output; and a current control circuit connected to the voltage regulating circuit, the constant current circuit and the storage battery, the current control circuit controlling the constant current circuit to control generation of the constant current output. The current control circuit enables and disables the constant current circuit to generate the constant current output periodically upon detection that the storage battery has been charged to full capacity.

Moreover, a charging indicator circuit is connected to the voltage regulating circuit and the current control circuit for indicating availability of the ac power source and charging capacity of the storage battery.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
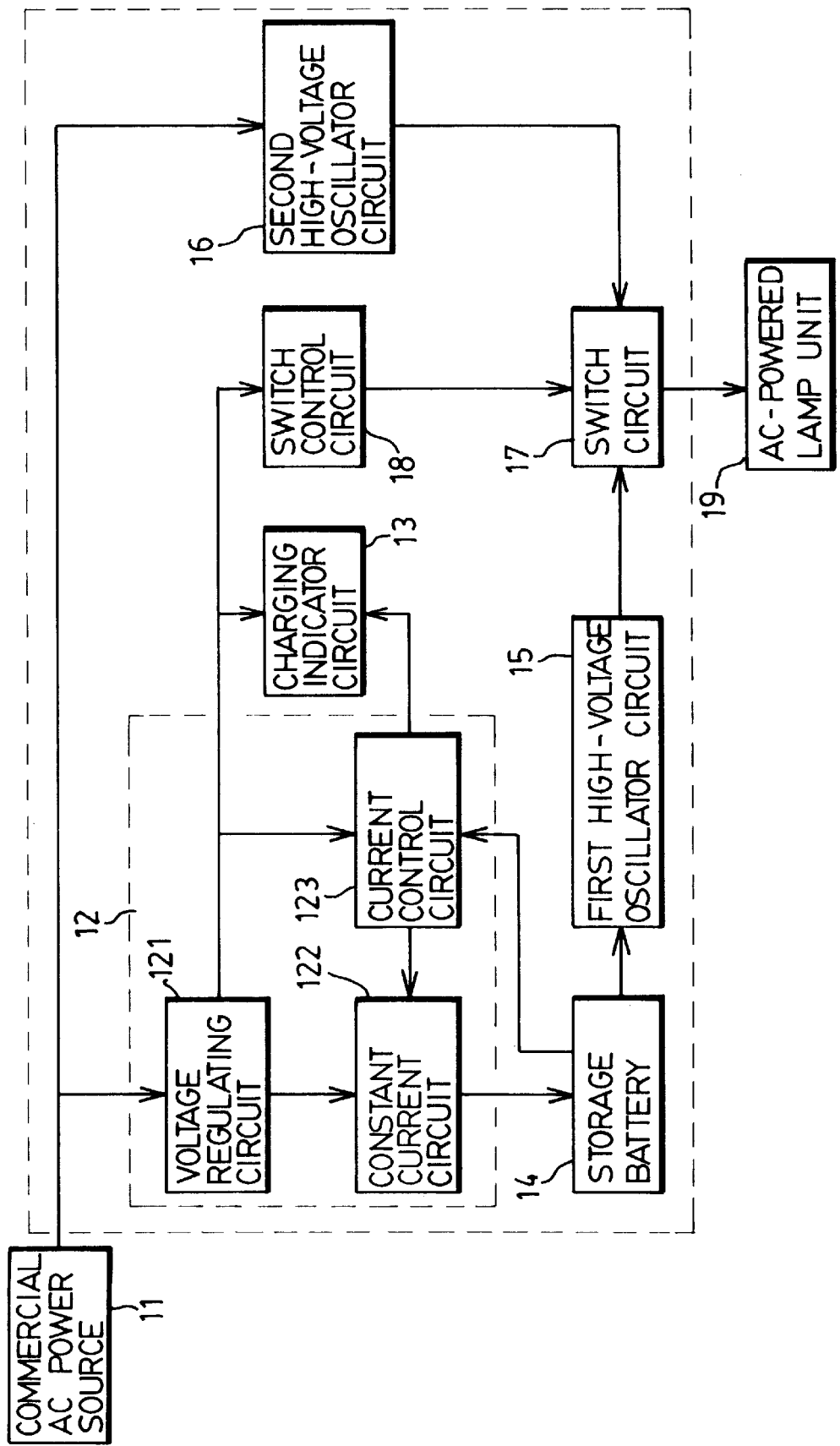
FIG. 1 is a schematic circuit block diagram of the preferred embodiment of a control apparatus for an ac-powered lamp unit according to the present invention.
Figure 2A:
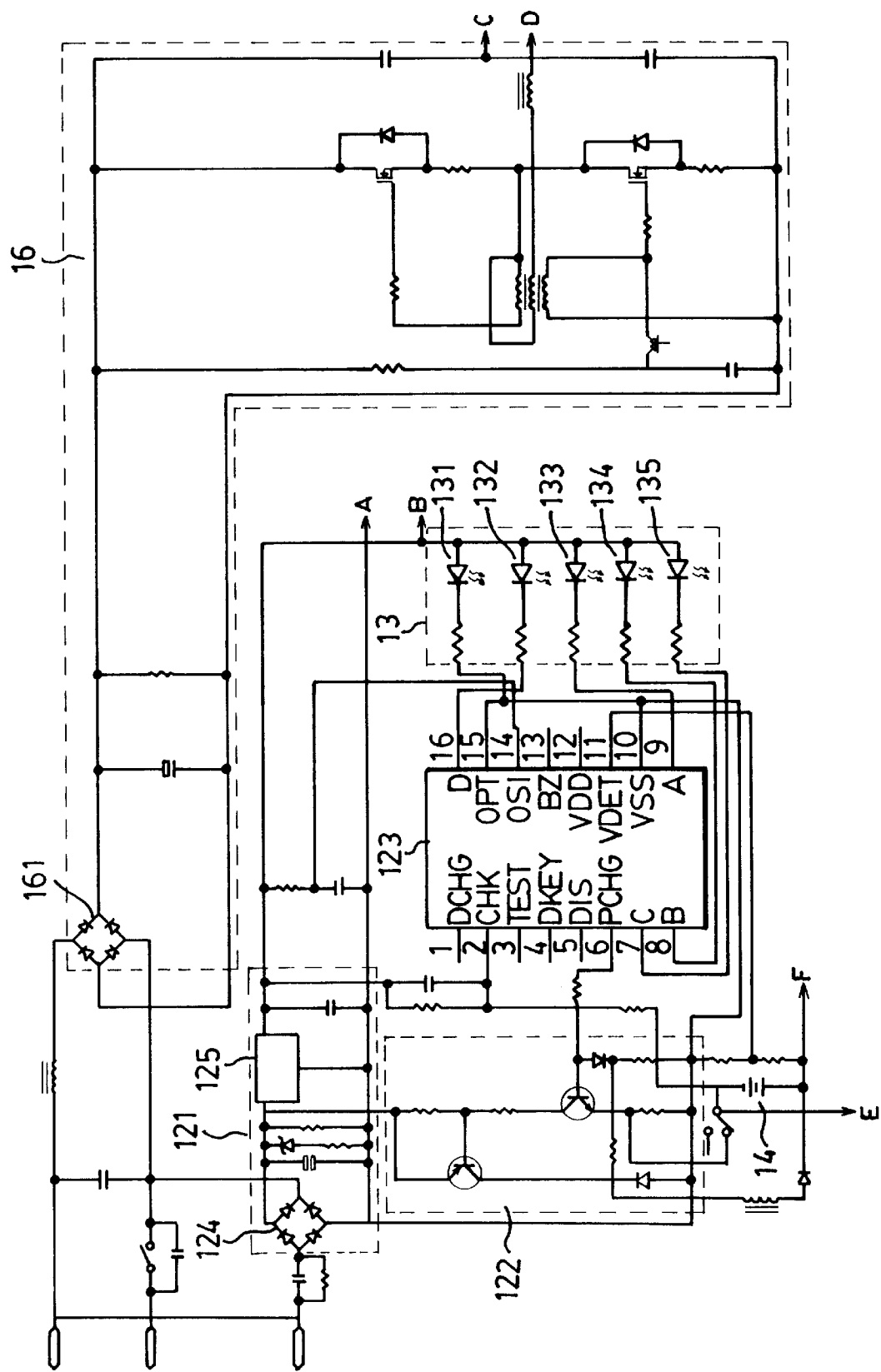
FIGS. 2A and 2B are schematic electrical circuit diagrams of the preferred embodiment.
Figure 2B:
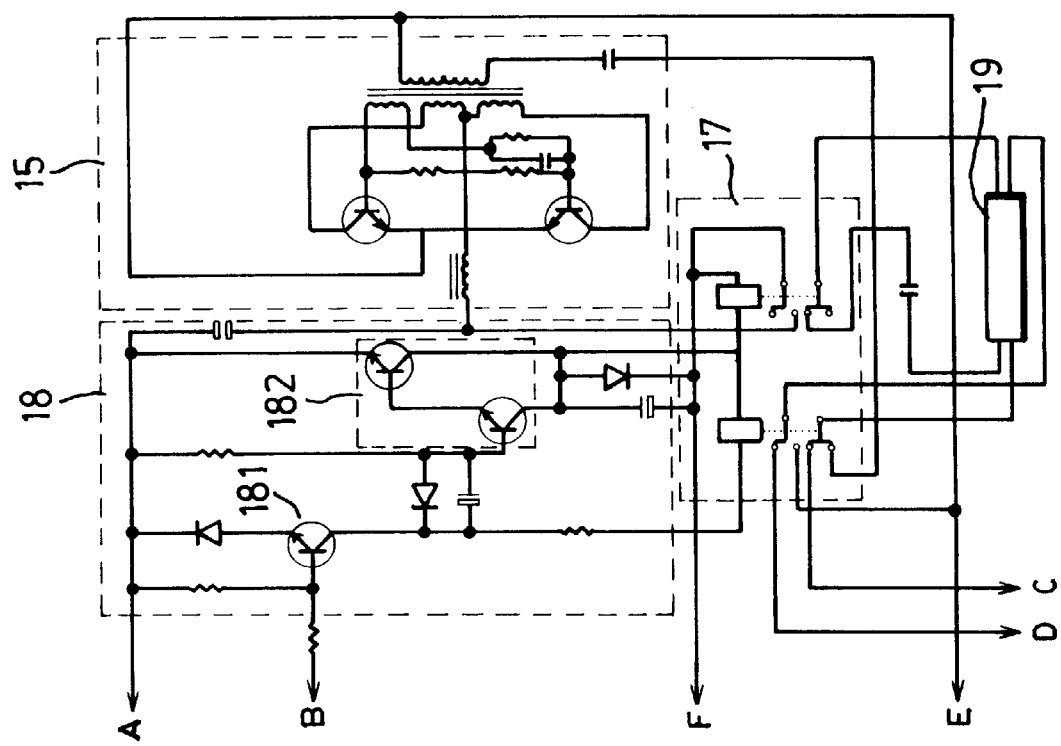

Referring to FIGS. 1, 2A and 2B, the preferred embodiment of a control apparatus for an ac-powered lamp unit 19, such as a fluorescent lamp, according to the present invention is shown to comprise a charging circuit 12, a charging indicator circuit 13, a storage battery 14, a first high-voltage oscillator circuit 15, a second high-voltage oscillator circuit 16, a switch circuit 17, and a switch control circuit 18.

The charging circuit 12 is responsible for providing a constant current output for battery charging purposes. As illustrated, the charging circuit 12 includes a voltage regulating circuit 121, a constant current circuit 122, and a current control circuit 123. The voltage regulating circuit 121 includes a bridge rectifier 124 and a voltage regulator 125 connected to the bridge rectifier 124. The bridge rectifier 124 generates a rectified dc voltage signal from a commercial ac power source. The voltage regulator 125 converts the rectified dc voltage signal from the bridge rectifier 124 to obtain a regulated dc voltage signal of about 5 volts. The constant current circuit 122 is connected to the voltage regulating circuit 121, and receives the rectified dc voltage signal from the bridge rectifier 124. The constant current circuit 122 generates a constant current output. In this embodiment, the current control circuit 123 is a programmed applications specific integrated circuit (ASIC), and is connected to the voltage regulating circuit 121 and the constant current circuit 122. The current control circuit 123 receives the regulated dc voltage signal from the voltage regulator 125, and controls the constant current circuit 122 to control generation of the constant current output. Particularly, the current control circuit 123 enables and disables the constant current circuit 122 to generate the constant current output periodically. This will be described in greater detail in the succeeding paragraphs.

The charging indicator circuit 13 is connected to the voltage regulating circuit 121 and the current control circuit 123. In this embodiment, the charging indicator circuit 13 includes first to fifth light emitting diodes 131–135. When the voltage regulating circuit 121 generates the regulated dc voltage signal, indicative of the availability of the commercial ac power source, the first light emitting diode 131 is activated to emit light. In addition, the current control circuit 123 controls activation of the second to fifth light emitting diodes 132–135 to indicate the status of the charging operation. This will be described in more detail in the following paragraphs.

The storage battery 14, such as a lead acid battery or a nickel cadmium battery, is connected to the constant current circuit 122 for charging by the constant current output of the latter. The storage battery 14 supplies a dc voltage output.

The first high-voltage oscillator circuit 15 is connected to the storage battery 14, and converts the dc voltage output of the latter into a first high-voltage oscillating signal having a frequency of about 20 KHz.

The second high-voltage oscillator circuit 16 includes a bridge rectifier 161 adapted to generate a dc voltage signal from the commercial ac power source, and subsequently converts the dc voltage signal into a second high-voltage oscillating signal having a frequency of about 20 KHz.

The switch circuit 17 is connected to the first and second high-voltage oscillator circuits 15, 16 and is adapted to provide one of the first and second high-voltage oscillating signals from the oscillator circuits 15, 16 to the ac-powered lamp unit 19. In this embodiment, the switch circuit 17 includes two relays.

The switch control circuit 18 is connected to the voltage regulating circuit 121 and the switch circuit 17. When the voltage regulating circuit 121 provides the regulated dc voltage signal to the switch control circuit 18 due to the availability of the commercial ac power source, a switching transistor 181 of the switch control circuit 18 is turned off, while a darlington pair 182 of the switch control circuit 18 is turned on. At this time, the switch control circuit 18 controls the switch circuit 17 to provide the second high-voltage oscillating signal from the second high-voltage oscillator circuit 16 to the ac-powered lamp unit 19. In the event of a power outage, the first light emitting diode 131 is deactivated, and the switching transistor 181 is turned on, while the darlington pair 182 is turned off. At this time, the switch control circuit 18 controls the switch circuit 17 toprovide the first high-voltage oscillating signal from the first high-voltage oscillator circuit 15 to the ac-powered lamp unit 19.

Charging of the storage battery 14 is conducted in the following manner: As mentioned beforehand, the current control circuit 123 controls the constant current circuit 122 to control generation of the constant current output. In the preferred embodiment, charging of the storage battery 14 depends on the capacity of the latter. When the capacity of the storage battery 14 is below 100%, pin 6 (PCHG) of the current control circuit 123 is at a high logic state, thereby enabling the current control circuit 123 to generate the constant current output for charging the storage battery 14. The current control circuit 123 detects the dc voltage output of the storage battery at pin 11 (VDET) thereof. When the capacity of the storage battery 14 reaches 25%, the current control circuit 123 activates the fifth light emitting diode 135 to emit light. When the capacity of the storage battery 14 reaches 50%, the current control circuit 123 activates the fourth and fifth light emitting diodes 134, 135 to emit light. When the capacity of the storage battery 14 reaches 75%, the current control circuit 123 activates the third, fourth and fifth light emitting diodes 133, 134, 135 to emit light. When the capacity of the storage battery 14 reaches 100%, the current control circuit 123 activates the second, third, fourth and fifth light emitting diodes 132, 133, 134, 135 to emit light. The second, third, fourth and fifth light emitting diodes 132, 133, 134, 135 are thus used to indicate the charging capacity of the storage battery 14.

The storage battery 14 is in a saturated state when the capacity thereof reaches 100%. At this time, pin 6 (PCHG) of the current control circuit 123 changes to a low logic state, thereby disabling the current control circuit 123 to interrupt the generation of the constant current output. Thereafter, pin 6 (PCHG) of the current control circuit 123 changes to the high logic state for a certain period (such as two seconds) every minute to commence periodic charging of the storage battery 14 upon detection by the current control circuit 123 that the storage battery 14 has been charged to full capacity.

In the preferred embodiment, pin 2 (CHK) of the current control circuit 123 is able to detect when the storage battery 14 is not installed. As such, pin 6 (PCHG) of the current control circuit 123 can be prevented from changing to the high logic state such that the constant current circuit 122 remains disabled when the storage battery 14 is not installed. In addition, in the event of a power outage, the voltage regulating circuit 121 ceases to provide the regulated dc voltage signal to the current control circuit 123, and the constant current circuit 122 is disabled to stop generation of the constant current output. Therefore, charging of the storage battery 14 does not occur in the event of a power outage.

The control apparatus of this invention has the following advantages:

1. When the commercial ac power source is available, the control apparatus permits normal operation of the ac-powered lamp unit and charging of a storage battery. The storage battery is charged periodically after charging to full capacity, thereby prolonging the service life and increasing efficiency of the storage battery.
2. The control apparatus permits operation of the ac-powered lamp unit as an emergency lighting device in the event of a power outage.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A control apparatus for an ac-powered lamp unit, comprising:

a charging circuit adapted to generate a constant current output from an ac power source;

a storage battery connected to said constant current circuit so as to be charged by the constant current output, said storage battery supplying a dc voltage output;

a first high-voltage oscillator circuit connected to said storage battery for converting the dc voltage output of said storage battery into a first high-voltage oscillating signal;

a second high-voltage oscillator circuit adapted to generate a dc voltage signal from the ac power source, and to convert the dc voltage signal into a second high-voltage oscillating signal;

a switch circuit connected to said first and second high-voltage oscillator circuits and adapted to provide one of the first and second high-voltage oscillating signals from said first and second high-voltage oscillator circuits to the ac-powered lamp unit; and a switch control circuit connected to said charging circuit and said switch circuit, said switch control circuit controlling said switch circuit to provide the second high-voltage oscillating signal from said second high-voltage oscillator circuit to the ac-powered lamp unit when the ac power source is available, and to provide the first high-voltage oscillating signal from said first high-voltage oscillator circuit to the ac-powered lamp unit in case of a power outage.

2. The control apparatus of claim 1, wherein said charging circuit includes:

a voltage regulating circuit adapted to generate a regulated dc voltage signal from the ac power source, the regulated dc voltage signal being provided to said switch control circuit;

a constant current circuit connected to said voltage regulating circuit for generating the constant current output; and a current control circuit connected to said voltage regulating circuit, said constant current circuit and said storage battery, said current control circuit controlling said constant current circuit to control generation of the constant current output.

3. The control apparatus of claim 2, wherein said current control circuit enables and disables said constant current circuit to generate the constant current output periodically upon detection that said storage battery has been charged to full capacity.

4. The control apparatus of claim 3, further comprising a charging indicator circuit connected to said voltage regulating circuit and said current control circuit for indicating availability of the ac power source and charging capacity of said storage battery.

5. The control apparatus of claim 4, wherein said chargina indicator circuit includes a plurality of light emitting diodes controlled by said current control circuit to indicate the charging capacity of said storage battery.

6. The control apparatus of claim 2, wherein said voltage regulating circuit includes a bridge rectifier adapted to generate a rectified dc voltage signal from the ac power source, and a voltage regulator connected to said bridge rectifier for converting the rectified dc voltage signal into the regulated dc voltage signal, the rectified dc voltage signal being supplied to said constant current circuit, the regulated dc voltage signal being further supplied to said current control circuit.

7. The control apparatus of claim 1, wherein said second high-voltage oscillator circuit includes a bridge rectifier adapted to generate the dc voltage signal from the ac power source.

8. The control apparatus of claim 1, wherein said switch circuit includes two relays.

* * * * *